United States Patent [19]
Bloecker et al.

[11] Patent Number: 5,697,155
[45] Date of Patent: Dec. 16, 1997

[54] METHOD OF MANUFACTURING A BRANCHED PIPE BY INTERNAL HIGH-PRESSURE FORMING

[75] Inventors: Henning Bloecker, Stelle; Pierre Bonny, Hamburg; Thomas Huelsberg, Rosengarten; Thoralf Nehls; Ralf Puenjer, both of Hamburg; Eckhard Reese, Apensen; Heinz-Ruediger Otte, Hamburg, all of Germany

[73] Assignee: Mercedes-Benz AG, Germany

[21] Appl. No.: 341,113

[22] Filed: Nov. 18, 1994

[30] Foreign Application Priority Data

Nov. 18, 1993 [DE] Germany .............. 43 39 290.3

[51] Int. Cl.$^6$ .................................. B23P 17/00
[52] U.S. Cl. ................... 29/890.148; 29/421.1; 72/62
[58] Field of Search .......... 29/890.148, 421.1, 29/507, 522.1, 523; 72/58, 62, 61

[56] References Cited

U.S. PATENT DOCUMENTS

| | | | |
|---|---|---|---|
| 2,238,038 | 4/1941 | Cornell, Jr. | 29/890.148 |
| 4,513,598 | 4/1985 | Costabile | 72/58 |
| 4,557,128 | 12/1985 | Costabile | 72/58 |
| 5,435,163 | 7/1995 | Schafer | 29/421.1 X |

FOREIGN PATENT DOCUMENTS

| | | | |
|---|---|---|---|
| 3243790 | 5/1984 | Germany . | |
| 3824312 | 1/1990 | Germany . | |
| 4017072 | 11/1991 | Germany . | |
| 0048626 | 2/1989 | Japan | 72/58 |
| 1391769 | 4/1988 | U.S.S.R. . | |
| 320930 | 4/1988 | U.S.S.R. . | |
| 1755992 | 8/1992 | U.S.S.R. | 72/58 |
| 0701536 | 12/1953 | United Kingdom | 29/890.148 |
| 702232 | 1/1954 | United Kingdom . | |
| 1104272 | 2/1968 | United Kingdom . | |
| 2193910 | 2/1988 | United Kingdom . | |

*Primary Examiner*—Peter Vo
*Assistant Examiner*—Khan Nguyen
*Attorney, Agent, or Firm*—Evenson, McKeown, Edwards & Lenahan P.L.L.C.

[57] ABSTRACT

The invention relates to a method and a device for manufacturing T-pieces from an unbranched starting piece of pipe by means of internal high-pressure forming (IHF). For this purpose, the starting piece of pipe is placed in a two-part forming tool which gives the shape, can be opened and closed, surrounds the starting piece of pipe, and has a cutout corresponding to the desired shape of the T-shaped pipe branch. Placed in a sealing manner against the two open end faces of the inserted starting piece of pipe in each case is a plunger which is movable in the forming tool and can be pushed axially into the forming took in each case by a pressure cylinder. The interior of the starting piece of pipe is filled with pressure fluid by means of an opening in at least one of the plungers, prior to being placed on the plungers in a sealing manner. A fluid high-pressure is built up by pushing the plungers axially into the forming tool with high force and, thus initiated, by pushing pipe wall material axially towards the forming point, the pipe wall material is pressed into the cutout in the forming tool and the T-shaped branch is thus shaped. In order to be able to manufacture T-pieces with a curved branch, the end face of the T-shaped cutout for the pipe branch is supported with controllable force by means of a flexible mandrel.

18 Claims, 5 Drawing Sheets

METHOD OF MANUFACTURING A BRANCHED PIPE BY INTERNAL HIGH-PRESSURE FORMING

BACKGROUND AND SUMMARY OF THE INVENTION

The invention relates to a method and to a tool for manufacturing T-pieces.

In a contribution by J. Tomasek "Automatisiertes Innendruckformen von Rohrformstucken" [Automated Internal Pressure Forming of Pipe Fittings] in the journal Blech Rohre Profile 38 (1991) 6, pages 505 to 508, a method for manufacturing T-pieces by internal high-pressure forming is assumed as known. Additionally, German Patent Document DE-A-2,019,439 also discloses such a method.

In the known method, the T-piece is formed by internal high pressure from an unbranched, continuous starting piece of pipe. The starting piece of pipe is surrounded in a positive-locking manner by a separable forming tool which gives the shape, can be opened and closed, and has a cutout corresponding to the desired shape of the T-shaped pipe branch. The interior of the starting piece of pipe which is sealed off towards the outside is filled with pressure fluid—with complete removal of the air enclosed by the starting piece of pipe. By building up a fluid high pressure inside the starting piece of pipe and by pushing the end faces of the starting piece of pipe axially into the forming tool at high force and, thus initiated, by pushing pipe wall material axially towards the forming point, pipe wall material is pressed into the cutout in the forming tool and the T-shaped branch is thus shaped. In this case, the wall material of the end face of the T-shaped branch is protected from excessive expansion by a support which yields to the extent of the shaping of the branch. The wall material of the end face of the T-shaped branch is supported there by the end face of a movably guided, yielding ram which, in turn, is held by a particular, possibly variable, counter-holding force via a piston which can be acted upon by a fluid.

The known device for manufacturing T-pieces from an unbranched starting piece of pipe according to the internal high-pressure forming method is distinguished as follows: a two-part forming tool is provided which gives the shape, can be opened and closed, surrounds the starting piece of pipe in a positive-locking manner, and has a cutout corresponding to the desired shape of the T-shaped pipe branch. Furthermore, the forming tool contains two plungers which can be placed in a sealing manner against the open end faces of the inserted starting piece of pipe, are guided movably in the forming tool, and can be pushed axially into the forming tool in case by a pressure cylinder. The interior of the starting piece of pipe can be filled with pressure fluid by means of at least one of the plungers—with complete removal of the air enclosed by the starting piece of pipe. Guided in the cutout for the T-shaped branch is the support of piston-like design for the wall material of the end face of the T-shaped branch, which support yields with controlled counter-holding force and was already mentioned in connection with the method.

Only T-pieces with a straight branch can be manufactured using the known method and the known forming tool. The drawing-out length of the branch which can be implemented in the wall material without cracking is also relatively small, at least in the case of steel.

In exhaust-gas collector pipes on multi-cylinder internal combustion engines, T-pieces with a curved branch are generally required for reasons of space. It has previously only been possible to manufacture such a T-piece by welding together a straight piece of pipe and an elbow. Disadvantageous in the prior art methods is not only the awkward production process comprising making a branch opening on the straight piece of pipe, manufacturing a pipe elbow, making an overlapping contour at the one end of the elbow and welding the parts together, but also the fact that it is impossible in a simple manner to manufacture pipe elbows with a radius of curvature smaller than the pipe diameter. However, since such small radius of curvature shapes is required for the application of exhaust-gas collector pipes for reasons of space, the tightly curved pipe elbow must be welded together from two semi-shells in mirror image manufactured by deep-drawing and trimming, for example, which is likewise very awkward, time-consuming and cost intensive, in particular because an expensive press and an expensive deep-drawing tool are required for this purpose. Moreover, even in the case of straight or slightly curved branches, the requirement is for a drawing-out length which is as large as possible in order to be able to avoid attachment by a separate welding-on operation.

Objects of the invention are to specify a method and an appropriate forming tool with which T-pieces with a greatly drawn-out and/or with a tightly curved branch can be manufactured in an efficient and cost-effective manner.

These objects are achieved according to the present invention by providing novel methods and devices for controlling the deformation of the material forming the T-piece branch during the internal high pressure forming of a T-piece in a mold having mold parts defining a curved T-piece branch. According to certain preferred embodiments of the invention, the wall material of the T-piece branch is protected from excessive expansion during the high pressure forming by means of a supporting surface movably and yieldingly applied to the outside wall surface of the material expanding into the curved T-piece branch of the tool mold. In certain preferred embodiments the supporting surface initially supports the wall material only in a punctiform manner at a center of the curved T-piece branch due to a spherical shaping of the supporting surface. According to certain preferred embodiments, the supporting surface yields along a curved line of movement, generating lines of the cutout for the T-piece branch extending parallel to said curved line of movement.

The advantages of the design of the method and of the device according to the invention lie in the fact that T-pieces with a greatly drawn-out branch and/or with a branch shaped in a curve can be shaped in a single, uniform forming operation on an unbranched, continuous starting piece of pipe without rupture, and efficient manufacture of such parts is thus made possible for the first time.

Other objects, advantages and novel features of the present invention will become apparent from the following detailed description of the invention when considered in conjunction with the accompanying drawings.

3

DETAILED DESCRIPTION OF THE DRAWINGS

Figures 1, 2:
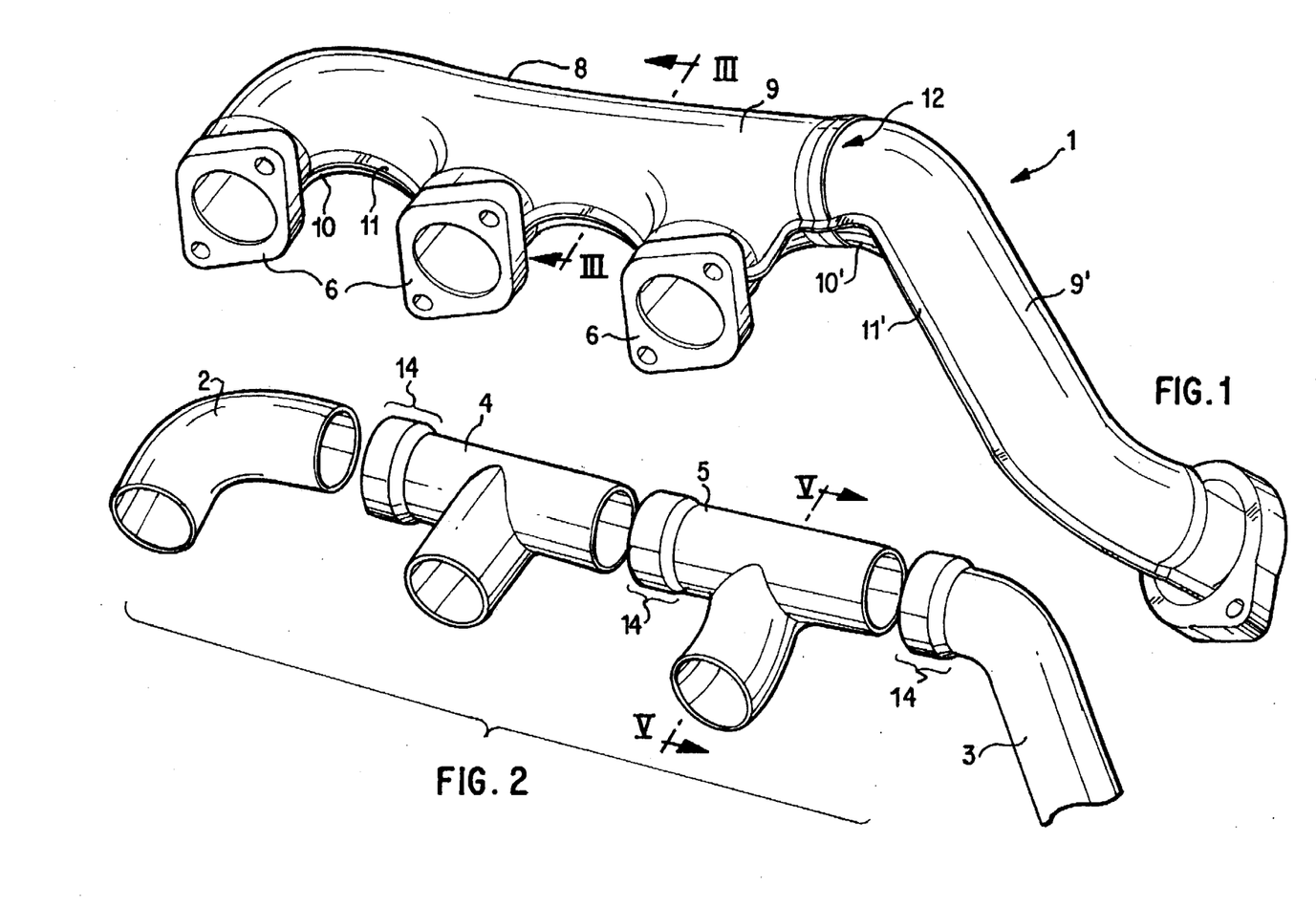
FIG. 1 is a perspective view of the outside of an exhaust-gas manifold which is isolated by an air gap for a row of cylinders of a multi-cyclinder internal combustion engine, constructed according to preferred embodiments of the invention.
FIG. 2 a perspective exploded view depicting individual inner elbows and T-pieces which can be used for the exhaust-gas manifold according to FIG. 1 in the respective installation position, but with a greater spacing in the axial direction.
Figure 3:
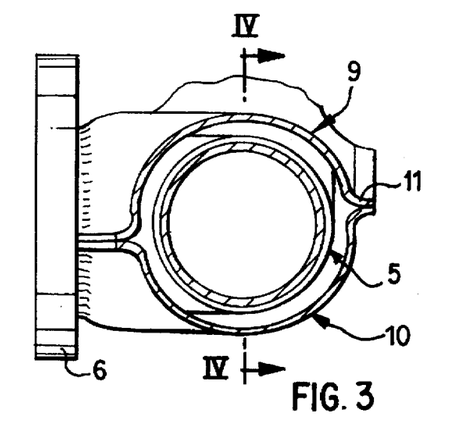
FIG. 3 is a cross-sectional view through the exhaust-gas manifold according to FIG. 1 along the section line III—III in FIG. 1 or in FIG. 4.
Figure 4:
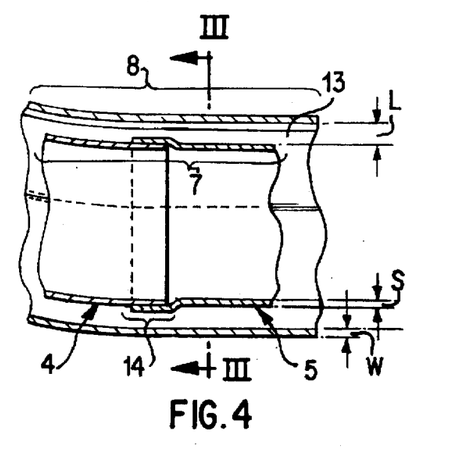
FIG. 4 is a partial longitudinal sectional view through the exhaust-gas manifold according to FIG. 1 or 3 along the section line IV—IV in FIG. 3.
Figure 5:
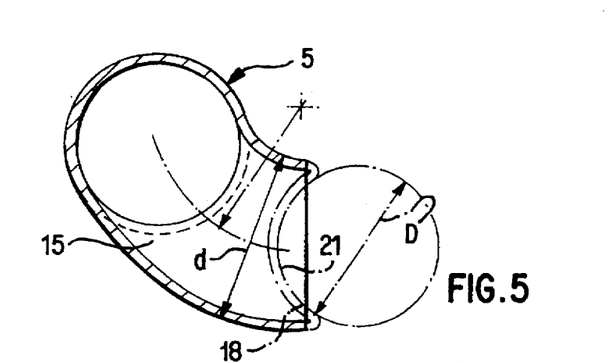
FIG. 5 is a cross-sectional through one of the T-pieces according to FIG. 2 with a curved branch along the section line V—V.
Figures 6, 7:
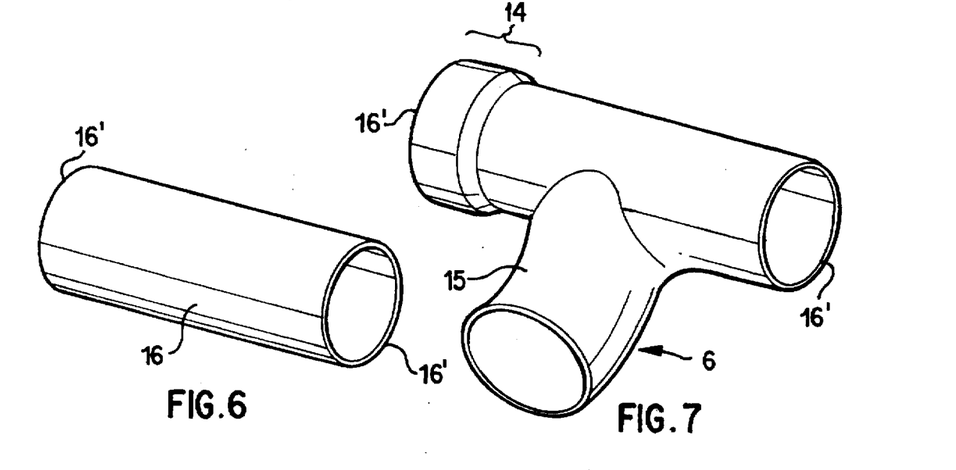
FIG. 6 is a perspective illustration of a straight starting piece of pipe such as is used for manufacturing the T-pieces.
FIG. 7 is a further perspective illustration of a T-piece with a curved branch in a different position from that in FIG. 2 or FIG. 5.

The exhaust-gas manifold 1 which is illustrated in FIGS. 1, 3 and 4 and is manufactured using the elbows 2 and 3 and T-pieces 4 and 5 illustrated in FIGS. 2, 5 and 7 is designed for a row of cylinders of an internal combustion engine having three cylinders, that is to say for a six-cylinder V-type engine which is fitted with two exhaust-gas manifolds at least approximately in mirror image of the type illustrated. The exhaust-gas manifold 1 is of dual-wall design with an outer wall 8 and an inner wall 7, an air gap 13 being provided as a thermal isolation between the two walls. This particularly effective thermal isolation serves the purpose of bringing the downstream catalyser (not illustrated) to the operating temperature as quickly as possible after starting the engine. In addition to good thermal isolation, it is also very important for this purpose that the mass of the inner wall parts 2 to 5 is as small as possible so that these also reach the operating temperature as quickly as possible. In relation to the inner wall 7, the dual-wall exhaust-gas manifold 1 is therefore composed of particularly thin-walled elbows 2 and 3 and T-pieces 4 and 5—wall thickness s—which do not have to fulfill a bearing function for the entire exhaust-gas manifold, but only a gas-conducting function; otherwise each elbow or T-piece only needs to withstand in each case its own weight and the gas forces exerted on the respective piece.

The outer wall 8 is formed from two continuous semi-shells 9 and 10 in the region of the flanges 6 and from two further semi-shells 9' and 10' in the region of the longer elbow 3, which semi-shells are welded to one another in a gastight manner by means of side seams 11 and 11'. The two pairs of semi-shells are pushed one inside the other at their mutual joint and are welded to one another in a gas tight-manner by means of a fillet seam 12. The outer wall 8

4 formed in this manner takes on the bearing function of the exhaust-gas manifold 1 and is therefore not only formed from two semi-shells which are continuous over relatively long partial regions, but these also consist of a thicker sheet metal—wall thickness W—for reasons of stability.

Apart from the bearing function, the outer wall 8 is also responsible for the reliable sealing of the exhaust-gas manifold 1 in relation to the exterior, for which reason the semi-shells 9 and 10 or 9' and 10' of the outer wall 8 have to be welded to all adjacent parts in a sturdy and reliably sealed manner at all points.

Considering the high exhaust-gas temperatures and the aggressive exhaust gas condensates, at least the material of the inner wall 7 must have good corrosion-resistance values. Since the "air" gap 13 also fills with exhaust gas via the expansion gaps (to be explained) between the elbows and T pieces 2 to 5 and can thus come into contact with exhaust-gas condensates, and since the outer wall 8 can also assume very high temperatures, the requirement for good corrosion resistance also applies to the outer wall.

Since the parts of the inner wall 7 and those of the outer wall 8 have greatly different temperatures, not only when the engine is started and after it has been switched off, but also under alternating loads, said wall parts also expand to a correspondingly differing extent. For this reason, a suitable expansion compensation must be ensured in the longitudinal and in the transverse direction between the inner wall 7 and the outer wall 8. The expansion compensation in the longitudinal direction, i.e. parallel to the flanges 6, is provided due to the fact that the elbows and T-pieces 2 to 5 are inserted in one another in a sliding manner sliding axially by means of sleeve-like pipe extensions—plug-on sleeves 14, but in this case are not welded to one another. In the transverse direction, i.e. transversely to the flanges 6, an expansion compensation is formed due to the fact that the elbows and T-pieces 2 to 5 are only welded on one side to the flanges 6 and to the semi-shells 9 and 10 of the outer wall 8 along a circular seam, but that they otherwise protrude freely into the interior of the space surrounded by the outer wall 8; the air gap 13 between the inner and outer walls is far greater—dimension L than the dimension of a relative expansion in the trans verse direction occurring as a maximum due to the temperature.

Since the elbows and T-pieces have to adjoin one another, for the reasons stated, in an approximately sealing but axially resilient manner, it is impossible to form the inner wall 7 as a whole, or even only in relation to the individual elbows and T-pieces, from semi shells following the example of the outer wall. On the contrary, the parts of the inner wall must be able to be inserted in one another with precise fit, at least in the region of their mutual connections, which is not readily possible with a shell design, but only with elbows and T-pieces of exactly defined cross-sectional shape, preferably of a circular shape at the connection points. A further reason why semi-shell designs are avoided in this case lies in the following fact: in a semi-shell design for the inner pipe, the flow of exhaust gas would impact on the welded seam and, in comparison with a seamless manner of manufacture, would reduce the anticipated service life or durability of the inner pipe.

Since there is generally only very little space available in an engine compartment, the exhaust-gas manifold must be designed in a space-saving manner as far as possible. For this reason, it is necessary for at least one of the T-pieces— the second T-piece 5 in FIG. 2—to be provided with a curved branch 15 so that the exhaust-gas manifold can be fitted into the remaining space in a space-saving manner. In a four-cylinder exhaust-gas manifold, at least two of the required three T-pieces would have to contain curved branches. The present invention is concerned with the problems of efficient manufacture of such T-pieces 5 with a curved branch 15.

To manufacture the desired T-pieces, the invention uses the internal high-pressure forming method which is known per se, but with which previously only straight branches could be shaped on T-pieces.

Figure 8:
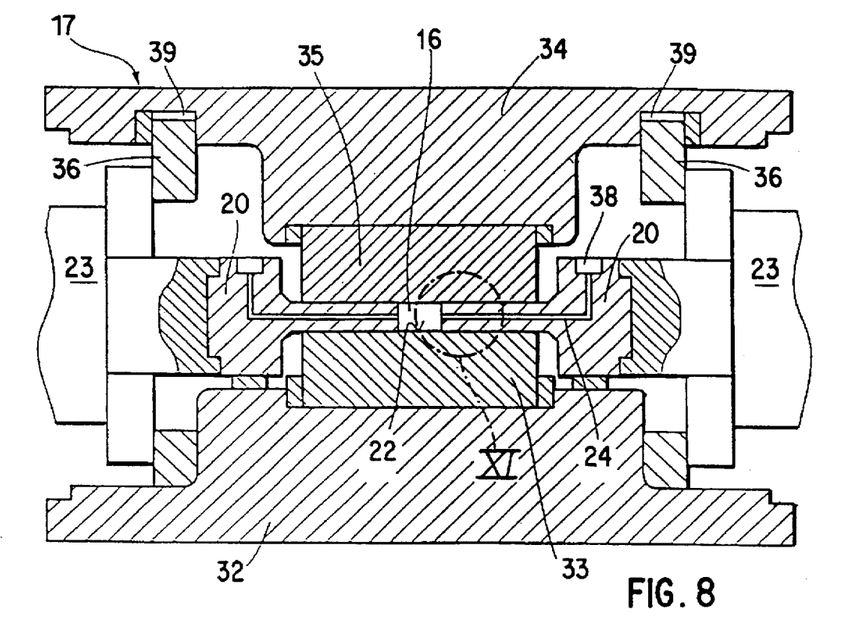
FIGS. 8 and 9 show in each case a vertical longitudinal section (FIG. 8) and a cross-sectional section (FIG. 9) through a tool for manufacturing a T-piece with a curved branch according to the internal high pressure forming method.

In the following description, the forming tool 17 for manufacturing the T-piece with a curved branch is firstly to be described with reference to FIGS. 8 and 9. Tool 17 consists essentially of two die-like tool moulds, namely a lower (33) and an upper tool mould 35, which can be joined together without a gap along a mould dividing surface and which together enclose between them a cutout 22 which extends on the near side and the far side of the mould dividing surface and gives the shape. The cutout corresponds in terms of its shape to the outer contour of the finished T-piece 5 with a curved branch 15 to be manufactured. In this case, however, the cutout merges in the region of each nozzle of the T-piece in each case into a receiving bore for a plunger, which is to be described in greater detail below.

The lower tool mould 33 is fixed on a base plate 32—possibly also of multi part construction—which, in turn, is screwed fixedly on a table of a press. The base plate 32 bears, on the two sides which are aligned transversely to the longitudinal axis of the T-piece 5 and of the cutout 22, vertically projecting support cheeks 36 on which pressure cylinders 23 for the plungers 20 lying equiaxially with the receiving bores of the cutout 22 are fastened. A further support cheek 37, likewise connected to the base plate, is aligned transversely to the branch 15; and bears a pressure cylinder 29 for a ram 27 which can be moved in a corresponding receiving bore 28. The upper tool mould is connected to a lifting plate 34 which, in turn, is screwed to the raisable and lowerable ram of a press. On its underside, the lifting plate bears receiving pockets which, when the upper tool mould 35 is lowered and the forming tool 17 is closed, are fitted over the upper end of the support cheeks and support the latter on the upper side as well in a positive-locking manner against yielding in the horizontal direction. As a result, the respectively assigned plungers 20 and the ram 27 can be pressed with great force into the corresponding receiving bores of the tool molds and a great axial force can be exerted on the workpiece. In the vertical direction, too, the two tool molds 33 and 35 must be held together with high force in the closed state so that they cannot be pressed apart by the high internal pressure in the workpiece.

The cutout 22 inside the forming tool 17 consists of a receiving bore which corresponds to the finished shape of the T-piece to be produced, is usually circular cylindrical or oval-cylindrical, if not always straight, in relation to the continuous pipe part, extends on both sides above and below the mold dividing half, and is slightly greater in its clear diameter than the diameter of the starting piece of pipe 16 from which the T-piece 5 is to be produced. Owing to the slight oversize, the starting piece of pipe can be placed in the tool easily and without obstruction. Laterally, the cutout 22 merges into a transversely branching channel which, in turn, is curved; however, a straight receiving bore 28 adjoins a channel of circular cross-section which is curved in some regions.

The plungers, which can be introduced on both sides into the longitudinal axis of the cutout 22, are hollowed-out and provided with an inlet bore 24 which merges into a pressure fluid connection 38 so that pressure fluid can be introduced at high pressure from outside into the interior of the starting piece of pipe. The plungers 20 have on their front region a slightly conical widening 47 and, offset axially behind the latter, a shoulder 48 which projects outwards by the dimension of the wall thickness of the starting pipe so that, when the plungers are introduced axially into the closed forming tool fitted with a starting piece of pipe 16, the plungers 20 move firstly in an expansion manner into the end faces 16' of the starting piece of pipe so that the wall of the starting piece of pipe rests snugly against the plunger 20 and against the shoulder 48. This leads not only to a seal between the starting piece of pipe 16 and the plunger 20 in the region of the end face 16', but also to a close contact of the starting piece of pipe, preventing creasing, against the surface of the forming tool giving the shape. Owing to its function, the plunger 20 has a certain amount of play in relation to the receiving bore in the tool so that it is not guided directly through the receiving bore, but a certain amount of guiding of the plunger even in the receiving bore is brought about indirectly via the wall material of the starting pipe, but this is of less importance here.

Figure 11:
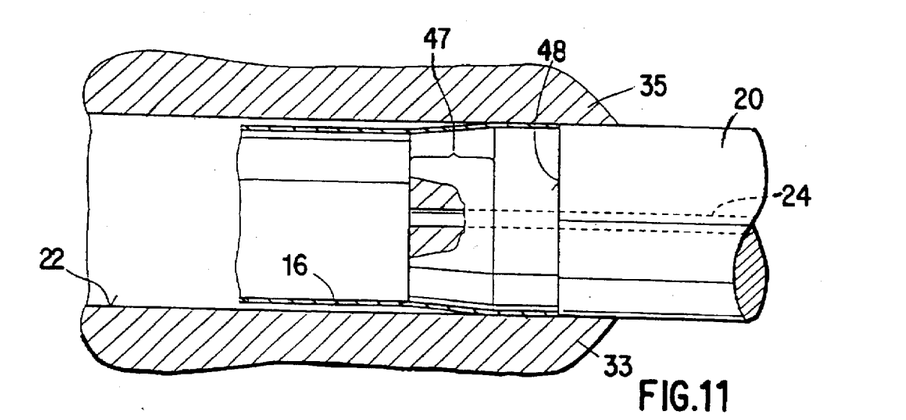
FIG. 11 shows an enlarged detail illustration of a detail XI from the longitudinal sectional illustration according to FIG. 8.

After the plungers 20 have been placed solely with the conical part 47 resting axially against the end faces 16' of the inserted starting piece of pipe 16, they are initially retained in this state; the interior of the starting piece of pipe can then be vented and filled with pressure fluid under moderate pressure. Only then are the plungers pushed into the starting pipe completely up to snug axial contact of the shoulder 48 against the end face 16', thus leading to a seal between the plunger and the pipe, which seal is fluid-tight even against high pressures. The state of the fluid-filled starting piece of pipe 16 and of the plungers 20 introduced in a sealing manner is illustrated in FIG. 11, but forming pressure has not yet been built up, so the starting piece of pipe still has its original diameter in the central region and at that point has a clear play relative to the cutout 22. The filling of the starting pipe with working fluid as a separate process step can be avoided if the lower tool part is placed in a trough filled with working fluid so that, even when the tool is open, the lower tool part lies with its upper edge below the fluid level by at least half the pipe diameter.

After filling and sealing, pressure is built up inside the starting pipe and increased to high values. With an increasing internal pressure inside the starting piece of pipe, force is exerted axially via the plungers 20 on the end faces 16' of the starting piece of pipe so that wall material is displaced axially towards the middle. The magnitude of the shearing forces depends on the level of the internal pressure; the internal pressure is the guiding parameter for the pressures set at the pressure cylinders 23. The higher the internal pressure is, the higher the shearing forces will also be. The high internal pressure, in the region of several thousand bar, prevents creasing of the wall material during the compression movement. At the same time, due to the internal pressure, the wall material is blown out into the transversely protruding cutout forming the branch. The generating lines of the cutout for the T-shaped branch 15 are curved in accordance with the radius of curvature R of the center-line of this branch.

A flexible mandrel with a support body 25 is guided so as to be axially movable on the end face facing the workpiece in the cutout of the branch of partially toroidal shape, which mandrel is supported, via the ram 27 which is movable with play in the receiving bore 28, on the pressure cylinder 29 via which a defined counter-holding force can be built up. The temporal or process-related variation of the counter-holding force is also essentially determined by the level of the internal pressure which also serves as a guiding parameter in relation to the counter-holding force. Specifically—apart from a short, uncontrolled blow-out without counter-holding—the counter-holding force is initially approximately constant despite increasing internal pressure; only when the internal pressure has reached approximately half its maximum value in terms of its order of magnitude is the counter-holding force increased. In the exemplary embodiment illustrated in FIGS. 9 and 10, the support body is of spherical design with a spherical supporting surface 18, the ball diameter D corresponding approximately to the diameter d of the branch 15. For reasons of completeness, it should be mentioned that other ball-like shapes, e.g. ellipsoids or optimized free shapes, can also be used at this point according to other contemplated preferred embodiments.

In the exemplary embodiment shown, the flexible mandrel 26 is formed by a plurality of successively arranged, identical, dish-shaped partial ball members 30 which are bounded on the one side by a convex ball surface and on the opposite side by a concave ball surface of mutually identical ball diameter D; in this case, the ball diameter corresponds approximately to the diameter d of the branch 15. The spherical support body is composed of two parts 25a and 25b and thus forms a full sphere.

The parts of the flexible mandrel 26 are held together by a pull cord 40 which passes centrally through it and are fixed on the ram 27. The transition member 30', lying directly adjacent to the ram 27 and acting as an adaptor between the piston and the member mandrel, only needs to be of concavely spherical design on the side facing the workpiece, whereas it is flattened on the side facing the ram. For reasons of completeness it should be mentioned that an alternative shape of the mandrel and of the transition member is also conceivable, in which the sides of the dish-shaped partial ball members facing the workpiece are of convex shape and the sides facing away from the workpiece are of concave shape.

Basically, the end face of the branch can already be supported and thus protected against excessive expansion directly prior to commencement of the shaping of said branch. However, it is more expedient for the protection against excessive expansion of the wall material of the end face 21 of the T-shaped branch 15 to begin only after a certain uncontrolled initial shaping of the branch. When the wall material pushed axially towards the forming point is blown out into the transversely projecting cutout part, a small "bubble" is initially formed, which bulges out in an uncontrolled manner into the cutout part without being supported at its end face 21. During this process, the free "bubble" expands radially in the region which does not touch the wall, and decreases in wall thickness which, however, benefits the wall thickness of the circumferential wall of the branch to be blown out. After the wall part has been cut off later in the region of the end face of the blown-out branch, attempts are made to draw out the material of this part of the workpiece as thinly as possible. However, after a particular blow-out state, the wall material of the end face 21 must be protected against excessive expansion by a support which yields to the extent of the shaping of the branch so that the "bubble" does not burst. The optimum, uncontrolled blow-out length must be determined empirically. When manufacturing T-pieces with a straight branch, an uncontrolled blow-out length of 38% of the pipe diameter or—with a 40 mm diameter—of 15 mm was found to be optimum. When manufacturing curved branches, there will be no basic change to this fact, but optimizing tests have not yet been able to be carried out in this regard. The support mentioned is effected by the supporting surface 18 at the front of the flexible mandrel 26. When the supporting surface 18 moves back in accordance with the increasing shaping, the support body yields along a curved line of movement 19, thereby following the generating lines of the cutout for the T shaped branch.

It has already been mentioned that the support body is of spherical design with a ball diameter D corresponding to the diameter of the branch. Owing to this design, the wall material of the end face 21 is placed against the ball initially only centrally and in a punctiform manner during the increasing blowing-out. Owing to the friction between the wall 21 and the support body 25 in the contact region, expansion there is suppressed to a great extent; as the blowing-out progresses further, the wall material initially expands in a centrifugal direction from the unsupported region so that the wall material is drawn out from this region. With increasing expansion, the end face 21 is placed against an ever-increasing surface on the support body, said contact surface increasing centrally from the inside towards the outside. The tensile stress in the end face is at its greatest at the outer edge of the contact surface, which means that the material flows to the greatest extent at this point. The flow is reduced at that moment at which a snug contact against the ball surface occurs. The point of maximum stress has again been displaced a short distance outwards. Based on this procedure, it is achieved that the wall material is drawn out radially outwards from the region of the end face. This end face will be cut off later in any case; consequently, it may readily be drawn out extremely thinly. The wall material drawn out here will later be found again in part in the end region of the branch. Owing to the spherical shape of the support body 25, not only is the material drawn out radially in the region of the end face 21, but very tight transition radii between the end face and the circumferential surfaces of the branch also result, as shown by experience. Based on the latter, a greater length of the circumferential surface of the branch can be utilized in comparison with a planar supporting surface in the region of the end face 21.

By means of the high internal pressure inside the workpiece—pressures of up to 4,000 bar and above can be applied—the wall of the workpiece is pressed with high force against the wall of the forming tool giving the shape. At the same time, however, wall material is to be displaced toward the forming point by pushing in the two plungers 20 axially. In order not to press creases into the pipe wall material during this displacement despite the high pressing forces, it is expedient for the friction between the outer surface of the starting pipe 16 and the surface of the tool giving the shape to be reduced by a friction-reducing coating. For this purpose, for example, a suspension of fine particles of solid lubricants, such as graphite, molybdenum disulphide or pigmented oils can be applied to the starting pipe 16 and/or to the surfaces of the forming tool 17 giving the shape. In this regard, certain development reserves still exist as far as the optimum selection and/or combination of lubricants which are known per se are concerned.

Figure 9:
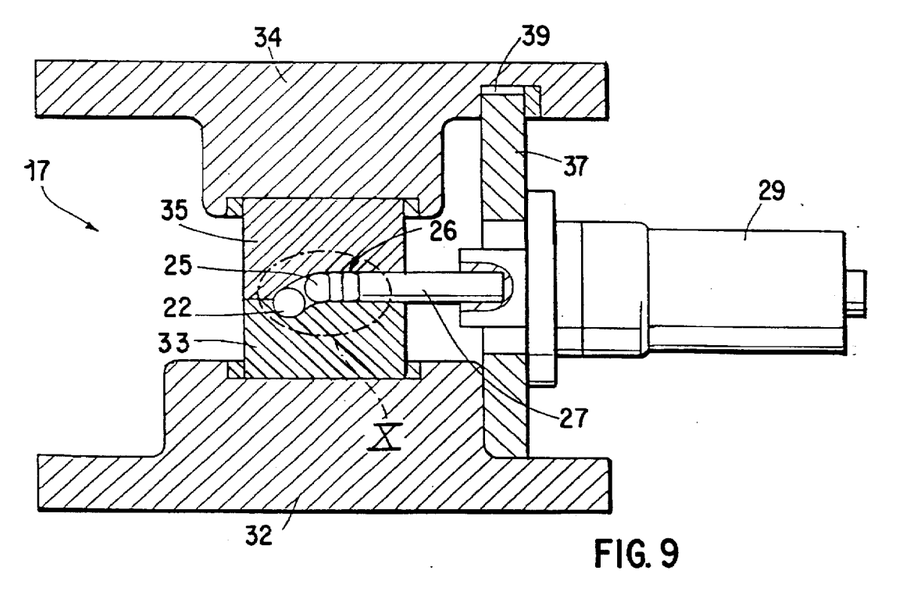
Figure 10:
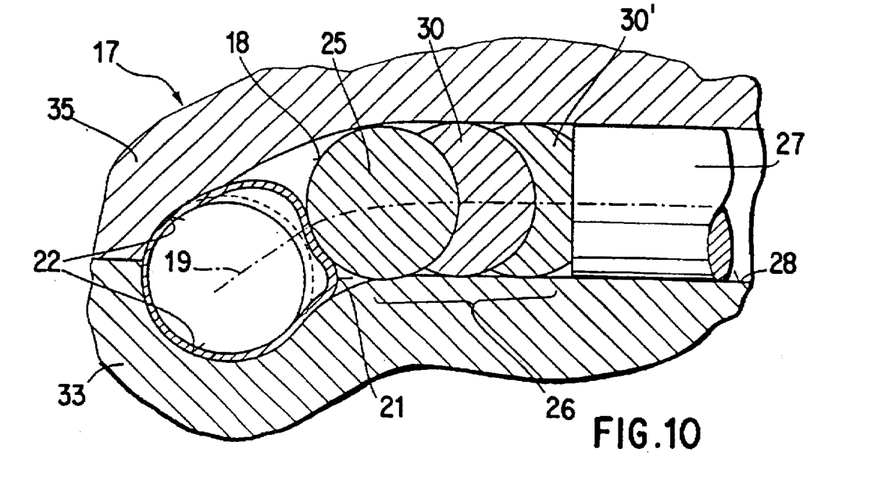
FIG. 10 shows an enlarged detail illustration of a detail X from the cross-sectional illustration according to FIG. 9.
Figure 12:
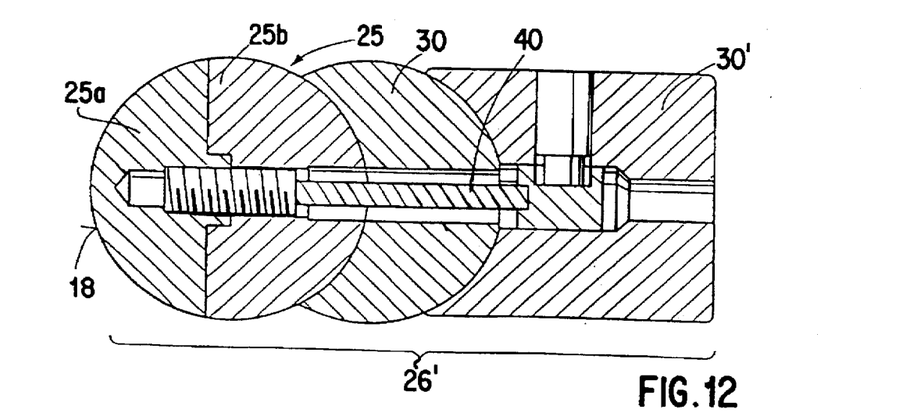
FIG. 12 shows an enlarged and more detailed individual illustration of the flexible ball mandrel such as is illustrated in a smaller and simplified manner in FIGS. 9 and 10.
Figure 13:
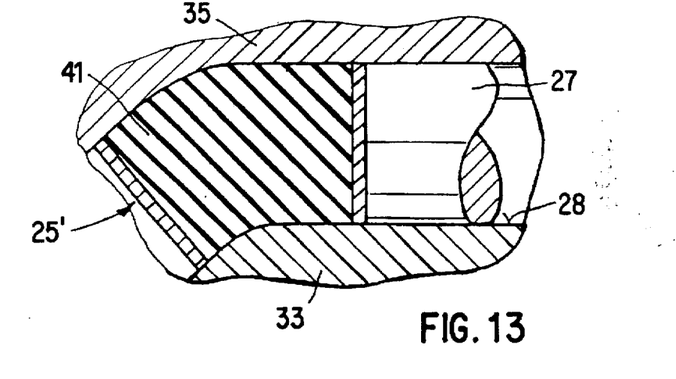
FIGS. 13 to 15 show three further basic illustrations of flexible mandrels of different design with a flat end face on the side facing the workpiece.
Figure 14:
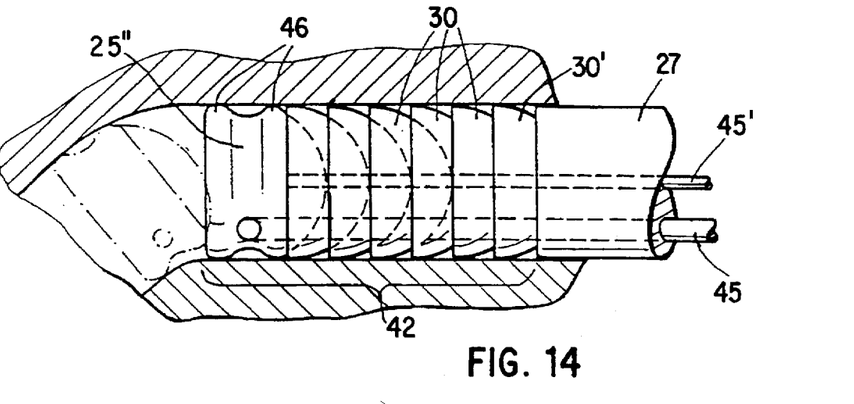
Figure 15:
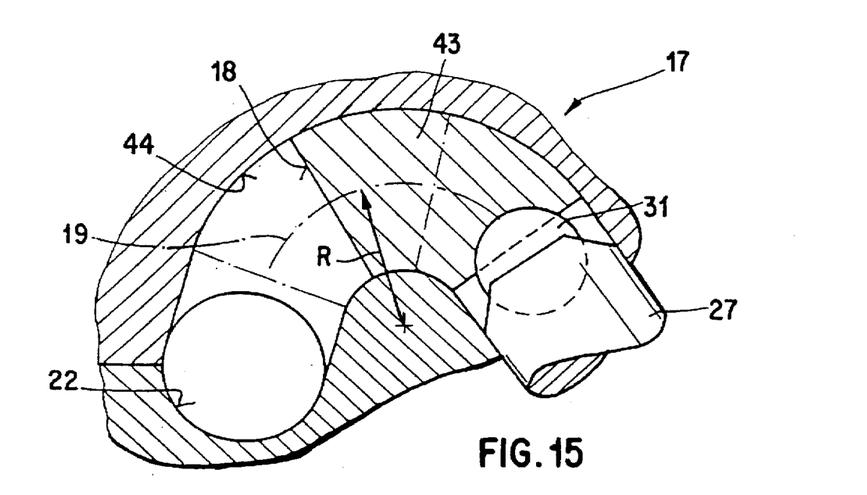

In the flexible mandrel 26 illustrated in FIGS. 9 and 10 and in the modification of the flexible mandrel 26' illustrated in FIG. 12, said mandrel is formed by partial ball members 30 and 30' and a spherical support body 25. Since, to remove the completely formed T-piece from the forming tool, the spherical support body and, with it, the entire flexible mandrel have to be retracted at least by the amount of compression of the support body into the end face of the branch—see FIG. 5, dot dashed contour, a flexible pulling element, in particular a pull cord 40, is arranged approximately centrally inside the flexible mandrel and is connected to the support body securely in terms of tension. The flexible mandrel can thus be retracted by means of the externally arranged actuating means 29. FIGS. 13 to 15 illustrate various other exemplary embodiments of the flexible mandrel.

In the exemplary embodiment of a flexible mandrel 41 illustrated in FIG. 13, the flexibility is formed by the fact that it consists essentially of a rubber-elastic material. Owing to the incompressibility of this material and owing to the fact that the flexible mandrel 41 is guided in a curved channel, it can transmit very high forces or pressures from the ram 27 onto the support body 25' mounted on the front. The latter is designed as a flat disc which—like the ram 27—is connected with firm adhesion to the rubber-elastic material. Expediently, friction-reduced scales should be applied to the circumference of the rubber-elastic body to reduce the friction between the rubber-elastic material and the channel wall. A thickening of the flexible mandrel due to axial compression forces should be prevented by a flexible armouring.

The flexible mandrel 42 illustrated in FIG. 14, similar to the exemplary embodiments according to FIGS. 9, 10 and 12, is likewise formed by partial ball members 30 and 30', the support body 25'', however, being formed essentially differently from those in the exemplary embodiments mentioned above. Specifically, in this case the end member of the flexible mandrel facing the workpiece is of disc-shaped design with a ratio of length to diameter of 0.43, for example; the supporting surface facing the workpiece is also of flat design in this exemplary embodiment; of course, other shapes, e.g. ball, ellipsoid or another optimized free shape, are also conceivable in this case. The side of the support body 25'' facing the last partial ball member likewise has a spherical surface with which it can be supported movably on the flexible part of the mandrel 42. Guiding rings 46 are mounted in each case on the circumference axially near to the two end edges of the support body 25'' on the end-face side; the support body being tapered between them. Owing to this design, the support body 25'' can be guided through a channel running in a curve approximately at right angles to its center-line, in which case it moves in a similar way to a pneumatic dispatch container. In order to support the deflection movement in the curved region of the channel, a connecting rod 45 is mounted eccentrically on the support body 25''; specifically, said connecting rod lies in the region of the inner curve of the channel or the corresponding circumferential point on the support body 25''. As a result, when the connecting rod 45 is pulled, the support body can be retained in the region of the inner curve so that it performs a pivoting movement in the region of the outer curve and is always disposed approximately perpendicular to the center-line. During the retraction movement, an opposed pivoting movement can be enhanced by a pull cord 45' mounted in the region of the center-line. By pulling the pull cord 45' and, if appropriate, by pressure on the connecting rod 45, the support body 25'' can be guided safely through the curved channel even during the retraction movement.

In the exemplary embodiment illustrated in FIG. 15, no flexible mandrel is provided. In contrast, in the exemplary embodiment shown there, the supporting surface 18, likewise illustrated to be flat, is always held orthogonally relative to the curved center-line 19 of the curved cutout for the branch due to the fact that a toroidal piston 43, which is inherently immobile, is guided so as to have sliding movement in a correspondingly designed, toroidal channel 44. The toroidal piston 43 is illustrated by uninterrupted lines in its retracted end position in FIG. 15, whereas the advanced starting position at the beginning of the blowing-out operation is indicated by dot-dashed lines. The toroidal piston 43 and the associated channel 44 have a curvature or a corresponding radius of curvature R which corresponds to the curvature of the branch to be produced; the channel curved in one plane extends in the same plane as the branch 15 to be produced. Linked pivotably to the side of the toroidal piston facing away from the workpiece is a straight and likewise inflexible ram 27, which is implemented in the exemplary embodiment illustrated with interposition of a pressure ball 31. Since the ram 27 has to be inserted to a relatively great extent into the curved region of the channel 44 and carries out a pivoting movement relative to the toroidal piston 43 in the order of magnitude of at least 45°, the ram 27 is correspondingly sloped or tapered on two opposite circumferential sides. In analogy to the exemplary embodiment of the forming tool—illustrated in FIG. 9—moreover in all the exemplary embodiments according to FIGS. 13 to 15—the ram 27 is, in turn, supported on an actuating member 29 which yields axially with a defined force.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for manufacturing a branched pipe from an unbranched, continuous starting piece of pipe by means of internal high-pressure forming, said method comprising the steps of:

providing a separable forming tool which can be opened and closed and which includes a cutout defining a branched pipe shape, said cutout having a first branch and a second branch which extends from said first branch;

placing an unbranched starting piece of pipe in said first branch;

pressing pipe wall material of said starting piece of pipe into said second branch by building up high-pressure of a fluid inside the starting piece of pipe and by pushing axial ends of the starting piece of pipe axially into the forming tool;

supporting an end face of the wall material being pressed into the second branch from excessive expansion by applying a convex supporting surface against said end face; and controlling said pressing and supporting steps such that the convex supporting surface initially supports the wall material of the end face only in a punctiform manner in a center portion of said convex supporting surface, and the wall material of the end face extends radially outward concentrically from the center portion of the convex supporting surface towards a peripheral edge of the convex supporting surface during increasing contact of the wall material against the convex supporting surface while moving the convex supporting surface along the second branch.

2. Method according to claim 1, wherein, prior to pushing the axial ends of the starting piece of pipe axially into the forming tool, the pipe wall of the starting piece of pipe is expanded in end regions by pushing plungers axially into the axial ends of the starting piece of pipe, such that outer surfaces of the end regions contact a surface of the forming tool defining the cutout.

3. Method according to claim 1, wherein said supporting step is initiated directly prior to commencement of an initial shaping of the end face in the second branch.

4. Method according to claim 1, wherein said supporting step is initiated only after a predetermined uncontrolled initial shaping of the end face in the second branch.

5. Method according to claim 1, wherein a coating is applied between an outer surface of the starting piece of pipe and a surface of the forming tool defining the cutout in order to reduce friction therebetween.

6. Method according to claim 1, wherein said branched pipe shape comprises a T-shape.

7. Method according to claim 1, wherein said supporting surface is generally spherical or ellipsoidal.

8. Method according to claim 1, wherein said second branch extends in a curved path.

9. Method according to claim 5, wherein said coating comprises a suspension of fine particles of solid lubricants selected from the group consisting of graphite, molybdenum disulphide and pigmented oils.

10. Method for manufacturing a branched pipe with a curved branch from an unbranched, continuous starting piece of pipe by means of internal high-pressure forming, said method comprising the steps of:

providing a separable forming tool which can be opened and closed and which includes a cutout defining a branched pipe shape, said cutout having a first branch and a second branch which extends in a curved path from said first branch;

placing an unbranched starting piece of pipe in said first branch;

pressing pipe wall material of said starting piece of pipe into said second branch building up high-pressure of a fluid inside the starting piece of pipe and by pushing axial ends of the starting piece of pipe axially into the forming tool;

supporting an end face of the wall material being pressed into the second branch from excessive expansion by applying a supporting surface against said end face, said supporting surface being movable along the curved path of the cut-out; and moving said supporting surface along the second branch away from the first branch during said pressing step.

11. Method according to claim 10, wherein, prior to pushing the axial ends of the starting piece of pipe axially into the forming tool, the pipe wall of the starting piece of pipe is expanded in end regions by pushing plungers axially into the axial ends of the starting piece of pipe, such that outer surfaces of the end regions contact a surface of the forming tool defining the cutout.

12. Method according to claim 10, wherein said supporting step is initiated directly prior to commencement of an initial shaping of the end face in the second branch.

13. Method according to claim 10, wherein said supporting step is initiated only after a predetermined uncontrolled initial shaping of the end face in the second branch.

14. Method according to claim 10 wherein a coating is applied between an outer surface of the starting piece of pipe and a surface of the forming tool defining the cutout in order to reduce friction therebetween.

15. Method according to claim 10, wherein said branched pipe shape comprises a T-shape.

16. Method according to claim 10, wherein said supporting surface is convex.

17. Method according to claim 10, wherein said supporting surface is generally spherical or ellipsoidal.

18. Method according to claim 14, wherein said coating comprises a suspension of fine particles of solid lubricants selected from the group consisting of graphite, molybdenum disulphide and pigmented oils.

* * * * *